United States Patent [19]
Nishide

[11] Patent Number: 5,721,885
[45] Date of Patent: Feb. 24, 1998

[54] PIXEL DATA TRANSFER SYSTEM

[75] Inventor: Kouichi Nishide, Tokyo, Japan

[73] Assignee: Kabushiki Kaisha Toshiba, Kawasaki, Japan

[21] Appl. No.: 558,781

[22] Filed: Nov. 16, 1995

[30] Foreign Application Priority Data

Jan. 19, 1995 [JP] Japan ................................. 7-006344

[51] Int. Cl.$^6$ ..................................................... G06F 13/00
[52] U.S. Cl. ........................... 395/525; 395/143; 395/503; 395/511; 345/189
[58] Field of Search ........................ 395/118, 141, 395/143, 501, 503, 509, 511, 520, 521, 522, 523, 525, 526; 345/185, 189, 190, 203

[56] References Cited

U.S. PATENT DOCUMENTS

| 5,167,015 | 11/1992 | Bair et al. | 395/143 |
| 5,444,825 | 8/1995 | Bain et al. | 395/143 |
| 5,452,412 | 9/1995 | Johnston, Jr. et al. | 395/143 |
| 5,499,328 | 3/1996 | Martin | 395/143 |

FOREIGN PATENT DOCUMENTS

| 2-160290 | 6/1990 | Japan . |
| 3-296097 | 12/1991 | Japan . |
| 4-128890 | 4/1992 | Japan . |
| 5-20452 | 1/1993 | Japan . |
| 5-113928 | 5/1993 | Japan . |

OTHER PUBLICATIONS

Abrash, M., "The Good, the Bad, and the Run-Sliced, (Bresenham's Run-Length Slice Algorithm)", Dr. Dobb's Journal, v17, n11, p. 171(6), Nov. 1992.
Angel, E. et al., "Short Note: Speeding Up Bresenham's Algorithm", IEEE Computer Graphics & Applications, v11, n6, pp. 16-17, Nov. 1991.
Gill, G., "N-Step Incremental Straight-Line Algorithms", IEEE Computer Graphics & Applications, v14, n3, pp. 66-72, May 1994.

Primary Examiner—Raymond J. Bayerl
Assistant Examiner—U. Chauhan
Attorney, Agent, or Firm—Finnegan, Henderson, Farabow, Garrett & Dunner, L.L.P.

[57] ABSTRACT

A controller in a line drawing circuit uses a Bresenham error term to detect a horizontal line segment in a straight line which is requested to be drawn. At this time, a signal NOPEL representing the number of pixels of the horizontal line segment and a data transfer request signal TRRQ are sent from the line drawing circuit to a data transfer control unit. The data transfer control unit uses a memory control circuit to perform block transfer of a plurality of data corresponding to the number of pixels constituting the horizontal line segment. Therefore, pixel data constituting the horizontal line can be transferred as a block, and the line drawing performance can be improved.

8 Claims, 12 Drawing Sheets

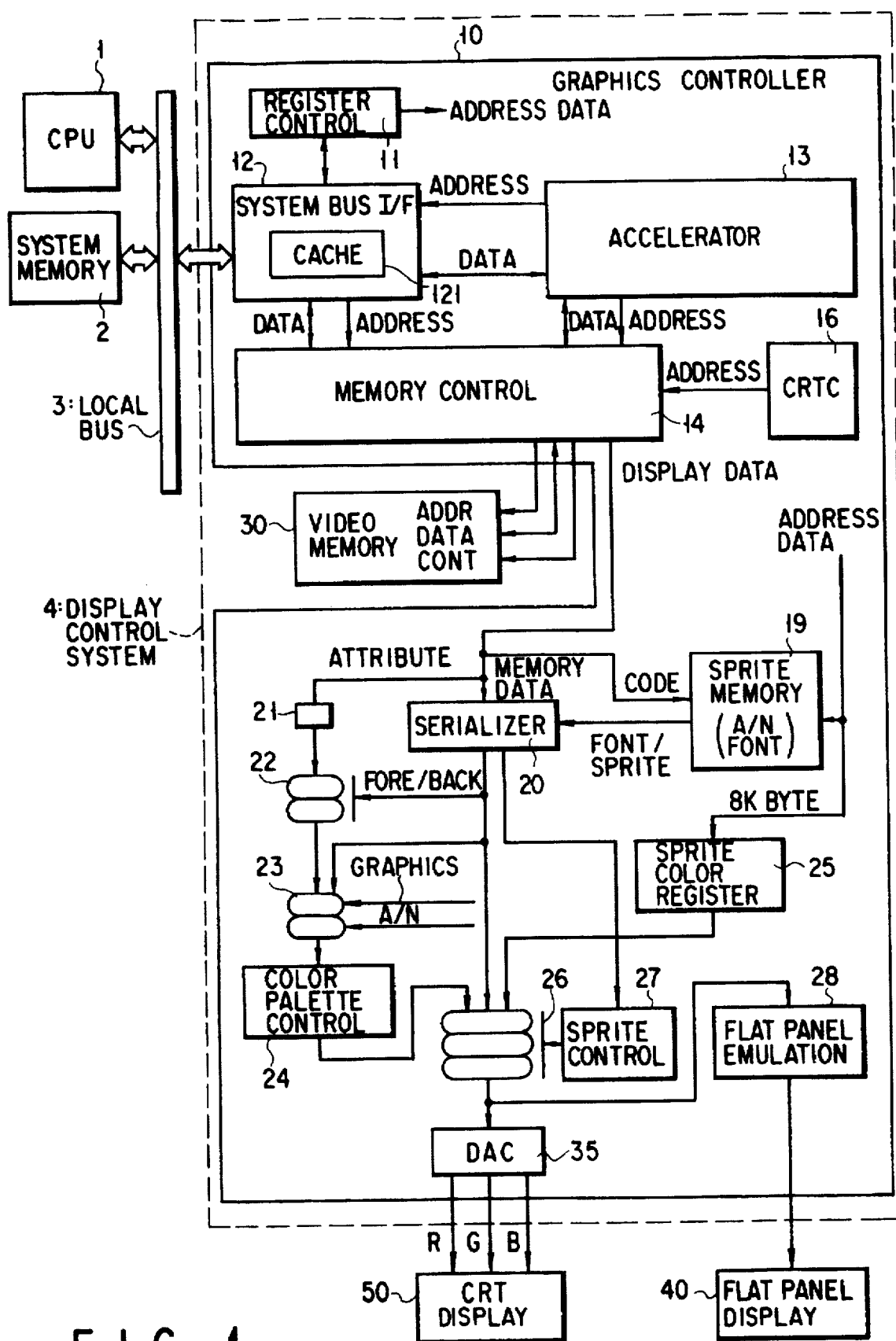
F I G. 1

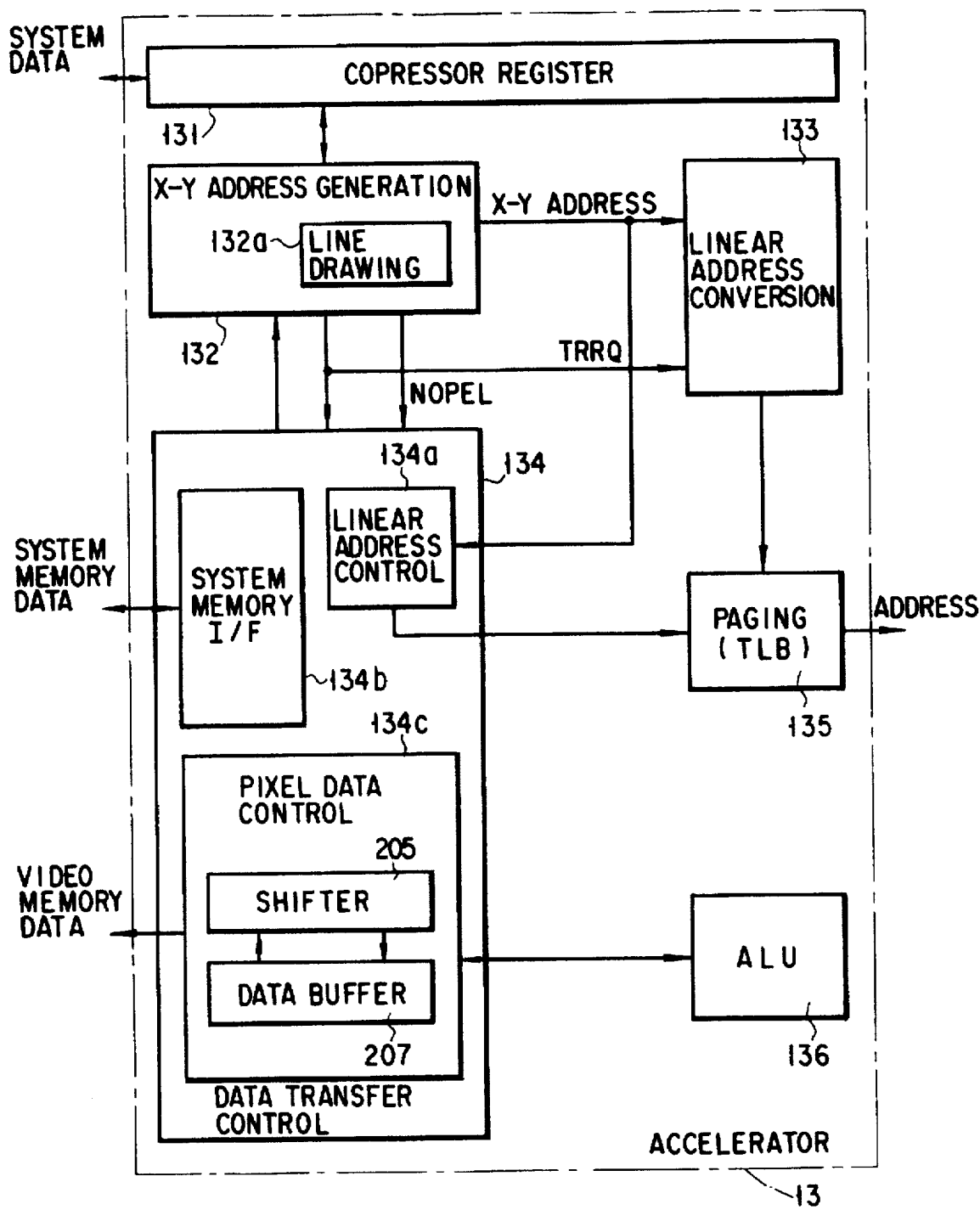
F I G. 2

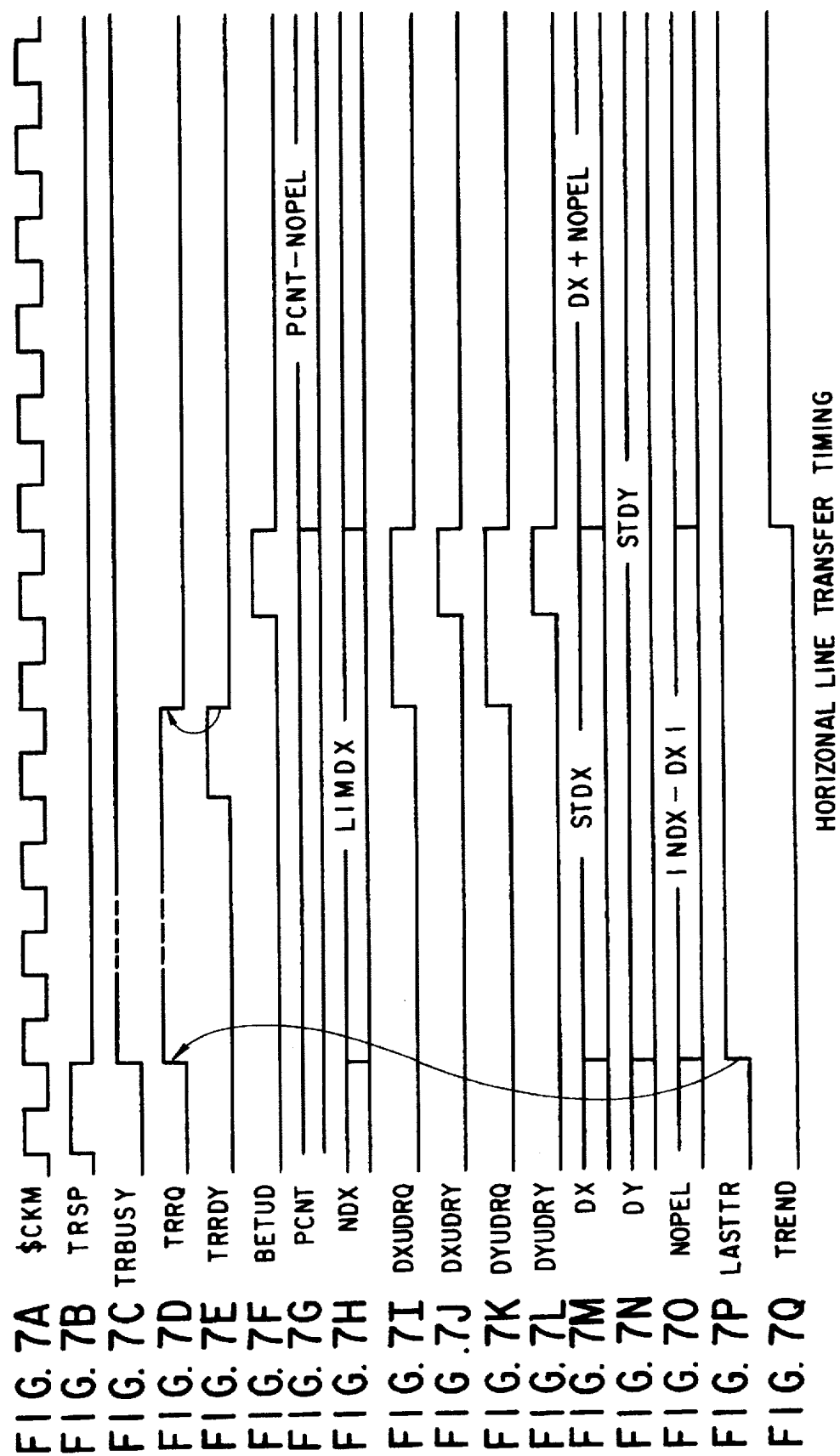

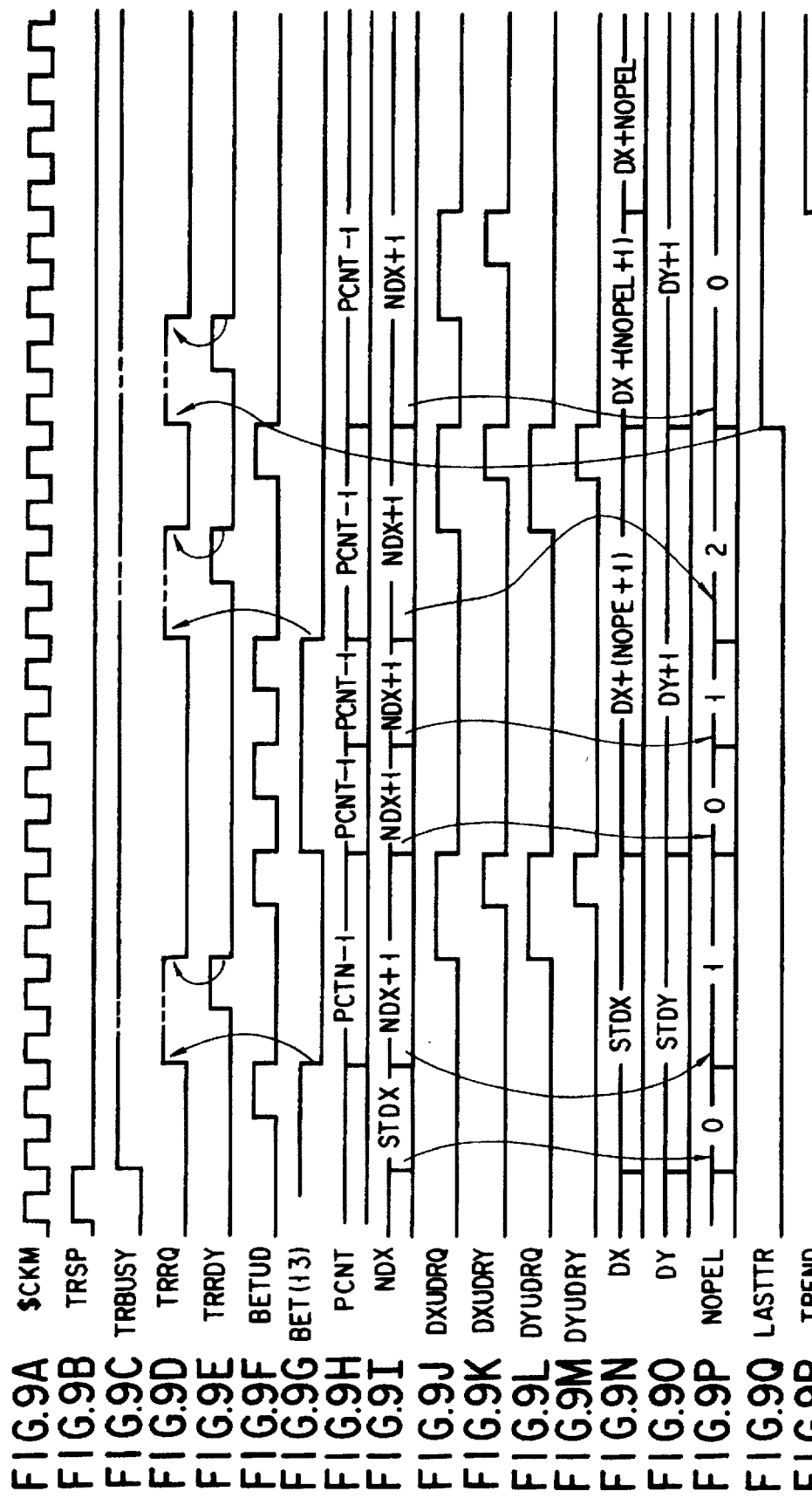

```
    7           3
 6                    2
        START
 4                    0
    5           1
```
BRESENHAM LINE DRAW OCTANT ENCODING
F I G. 13 (PRIOR ART)
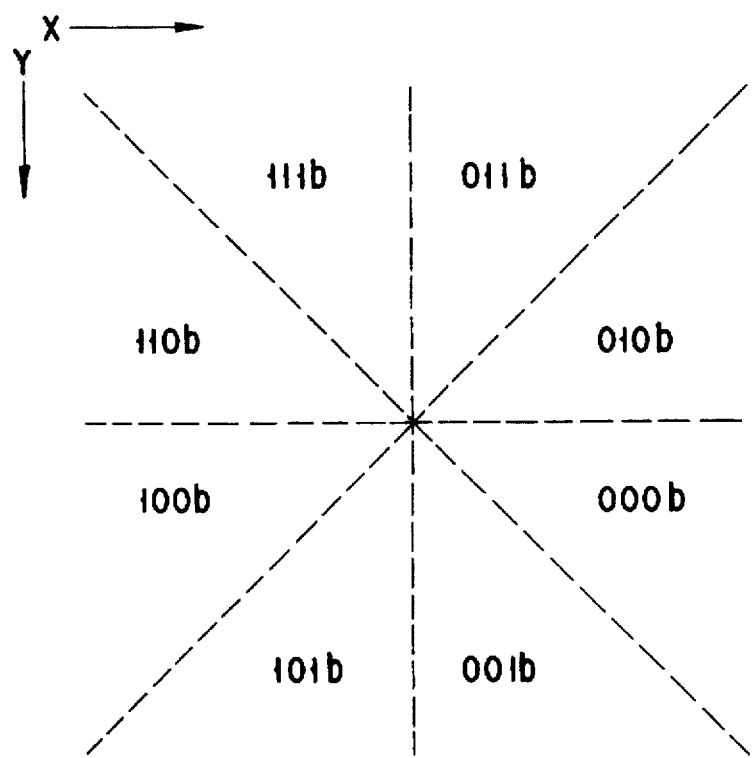
F I G. 16

PIXEL OPERATIONS REGISTERS

| 31 30 29 28 27 | 24 23 | 20 19 | 16 15 | 12 11 | 8 7 | 6 5 | 4 3 2 | 0 |
|---|---|---|---|---|---|---|---|---|
| | | | | x x x x | x x | | x | |
| 1 | 2 | 3 | 4 | 5 | 6 | 7 | 8 | 9 |

FIG. 14

| 31 30 29 28 27 | 24 23 | 20 19 | 16 15 | 12 11 | 8 7 | 6 5 | 4 3 2 | 0 |
|---|---|---|---|---|---|---|---|---|
| 0 0 0 0 1 | 0 1 | 0 0 1 | 0 0 1 1 | 0 0 0 x x x x | x x 0 0 | 0 0 | 0 0 x | 0 |

FIG. 15

PIXEL DATA TRANSFER SYSTEM

BACKGROUND OF THE INVENTION

1. Field of the Invention

The present invention relates to a graphics controller for controlling the display monitor of a personal computer and, more particularly, to a graphics controller which has a bitmap video memory and transfers data to the video memory to draw graphic patterns.

2. Description of the Related Art

In recent years, various laptop or notebook type portable personal computers have been developed.

Conventionally, a graphics controller used in a personal computer of this type has drawing functions of forming basic graphic patterns such as a straight line, painting an area, and the like. Of these drawing functions, straight line drawing is executed by a line drawing circuit arranged in a graphics controller.

When straight line drawing is requested by a host CPU, the line drawing circuit transfers drawing data in units of pixels to a video memory while calculating two-dimensional coordinate values of the straight line in units of pixels from the start coordinates to the end coordinates. Such drawing processing is performed even when the straight line as a drawing target is a horizontal line.

In horizontal line drawing, the linear addresses of adjacent pixels on the video memory are contiguous. For this reason, in principle, image data corresponding to a plurality of pixels can be transferred to the video memory as a block in one memory transfer cycle.

In the conventional line drawing circuit, however, a horizontal line and a line of another type are not discriminated from each other, as described above. In drawing a line of any type, data corresponding to only one pixel is always transferred in one data transfer cycle. Even in horizontal line drawing, the data transfer cycle must be repeatedly executed in correspondence with the number of pixels constituting the line, as in drawing a line of another type. Therefore, the drawing processing undesirably takes long time.

In the conventional line drawing circuit, drawing data is transferred to the video memory in units of pixels while a two-dimensional coordinate value is calculated in units of pixels. Data corresponding to one pixel is always transferred in one data transfer cycle. For this reason, even in horizontal line drawing, the data transfer cycle must be repeatedly executed in correspondence with the number of pixels constituting the horizontal line. Therefore, the drawing processing undesirably takes long time.

SUMMARY OF THE INVENTION

It is an object of the present invention to provide a graphics controller which can transfer pixel data constituting a horizontal line as a block when a straight line as a drawing target includes a horizontal line component, thereby largely increasing the drawing speed for a straight line.

According to the present invention, there is provided a graphics controller having a bitmap video memory to control a display monitor, comprising means for detecting horizontal line segments included in a straight line when straight line drawing is designated, means for counting a number of pixels constituting each of the detected horizontal line segments; and data transfer means for performing block transfer of a plurality of drawing data corresponding to the number of pixels constituting each of the horizontal line segments to the video memory and writing the drawing data at contiguous addresses of the video memory.

In this graphics controller, when a horizontal line segment is included in a straight line which is requested by a host system to be drawn, the horizontal line segment is detected. For example, when horizontal line drawing is requested, the entire horizontal line requested is detected as a horizontal line segment. When drawing of a straight line having a gradient is requested, each of a plurality of horizontal line segments is detected because of the straight line is normally constituted by a plurality of horizontal line segments with different vertical coordinate values. The number of pixels of each of the horizontal line segments is counted, and a plurality of drawing data corresponding to the number of pixels constituting each of the horizontal line segments are transferred to the video memory as a block.

Therefore, the straight line drawing performance can be largely improved as compared to the conventional graphics controller which transfers data to the video memory in units of pixels.

As the means for detecting the horizontal line segment, means for calculating the coordinate values for drawing the straight line by using the Bresenham algorithm and detecting a pixel position where the vertical coordinate value changes can be used. The Bresenham algorithm is a coordinate value generation algorithm in which it is determined in units of pixels which value is set as next coordinate values $(X+1,Y)$ or $(X+1,Y+1)$ of current coordinate values $(X,Y)$ with respect to a line segment normalized to octant 0. The values $(X+1,Y)$ or $(X+1,Y+1)$ are determined by the value of a Bresenham error term (E). When the Bresenham error term $(E) \geq 0$, the coordinate values $(X+1,Y+1)$ are selected. Therefore, the pixel position where the Y-coordinate value changes in the straight line can be detected in accordance with the Bresenham error term (E).

When means for converting line parameter values which designate a horizontal line segment to parameter values for BIT block transfer is arranged, block transfer of pixels constituting the horizontal line segment can be performed using a normal BIT block transfer circuit. BIT block transfer is a basic function supported by a normal graphics controller. Therefore, by using BIT block transfer, block transfer of pixels constituting a horizontal line segment can be performed without arranging dedicated hardware.

According to the present invention, when a straight line which is requested by the host system to be drawn includes horizontal line segments, the number of pixels constituting each horizontal line segment is counted, and data corresponding to the number of pixels constituting each of the horizontal line segments is transferred to the video memory as a block. Therefore, the straight line drawing performance can be largely improved as compared to the conventional graphics controller which transfers data to the video memory in units of pixels.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the arrangement of a display control system using a graphics controller according to an embodiment of the present invention;

FIG. 2 is a block diagram showing the arrangement of a graphics accelerator arranged in the graphics controller shown in FIG. 1;

FIGS. 7A through 7Q are timing charts for explaining the operation of the line drawing circuit shown in FIG. 3 in drawing the horizontal line shown in FIG. 6;

FIGS. 9A through 9R are timing charts for explaining the operation of the line drawing circuit shown in FIG. 3 in drawing the line shown in FIG. 8, which includes the horizontal portion;

FIG. 13 is a view showing octant encoding in line drawing using the Bresenham algorithm;

FIG. 14 is a view showing contents defined in a coprocessor register 131 shown in FIG. 2 in line drawing executed by the graphics accelerator 13 shown in FIG. 1;

FIG. 15 is a view showing a definition set in the coprocessor register 131 in the line drawing operation;

FIG. 16 is a view showing the relationship between a direction of line drawing and a value set in the direction octant field of the coprocessor register 131.

DETAILED DESCRIPTION OF THE PREFERRED EMBODIMENTS

Figure 3:
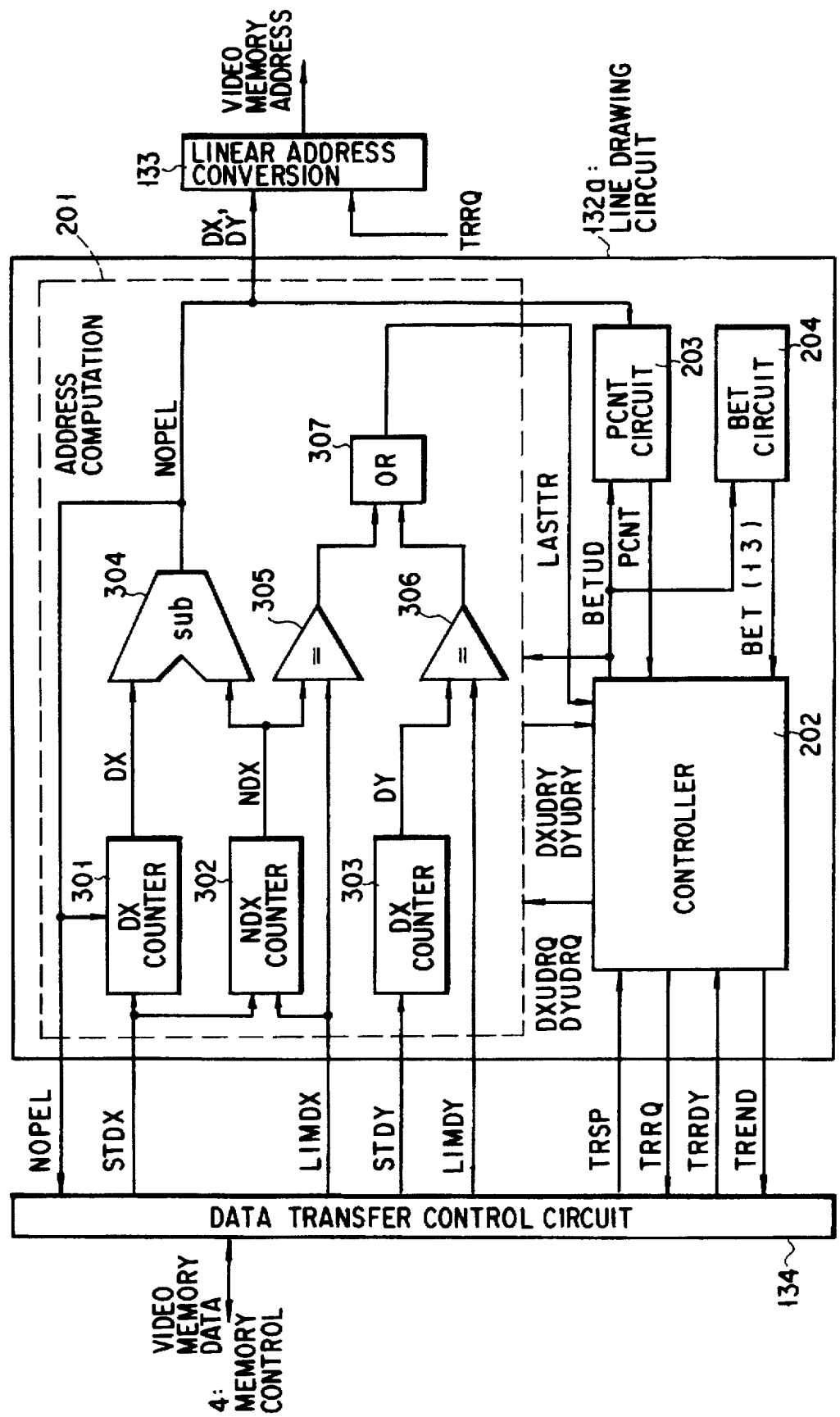
FIG. 3 is a block diagram showing the arrangement of a line drawing circuit arranged in the graphics accelerator shown in FIG. 2.

The embodiment of the present invention will be described below with reference to the accompanying drawings.

FIG. 1 is a block diagram showing the overall arrangement of a display control system using a graphics controller according to an embodiment of the present invention. A display control system 4 is based on XGA specifications and performs display control for both a flat panel display 40 arranged as the standard equipment of a portable computer main body and a color CRT display 50 detachably connected to the portable computer main body. The display control system 4 is connected to a local bus 3 such as a VL bus and a PCI bus, as shown in FIG. 1.

The display control system 4 has a graphics controller 10 and a video memory 30. The graphics controller 10 and the video memory 30 are mounted on the system board of the portable computer.

The graphics controller 10 is an LSI implemented by a gate array and constitutes the main part of the display control system 4. The graphics controller 10 controls the flat panel display 40 and the color CRT display 50 in accordance with an instruction from a host CPU 1. The graphics controller 10 can also function as a bus master and directly access a system memory 2.

The video memory 30 is a bitmap memory for storing a frame image to be displayed on the flat panel display 40 or the color CRT display 50. The video memory 30 is constituted by, e.g., a synchronous DRAM. The synchronous DRAM is a memory characterized by a clock synchronous operation, operation mode control by a command, and a two-bank memory cell array structure. The video memory 30 can be realized by, e.g., parallelly connecting two synchronous DRAM chips each with a 256K×16 bits structure. In this case, data read/write access is performed in units of 32-bit widths.

Image data prepared by an application program suitable for the XGA specifications is stored in the video memory 30 by the packed pixel method. The packed pixel method is a color information mapping method in which one pixel is represented by a plurality of continuous bits in the memory. For example, a method of representing one pixel by 1, 2, 4, 8, 16, or 24 bits is employed. On the other hand, image data of VGA specifications is prepared by an application program suitable for the VGA specifications and stored in the video memory 30 by the memory plane method. In the memory plane method, a memory area is divided into a plurality of planes designated by the same address, and color information of each pixel is assigned to the plane. When four planes are present, one pixel is represented by 4-bit data, i.e., one bit per plane.

The video memory 30 also stores text data. For either XGA or VGA specifications, text data corresponding to one character has a size of two bytes consisting of an 8-bit code and an 8-bit attribute. The attribute consists of 4-bit data for designating a foreground color and 4-bit data for designating a background color.

The graphics controller 10 comprises a register control circuit 11, a system bus interface 12, a graphics accelerator 13, a memory control circuit 14, a CRT controller (CRTC) 16, a sprite memory 19, a serializer 20, a latch circuit 21, a foreground/background multiplexer 22, a graphic/text multiplexer 23, a color palette control circuit 24, a sprite color register 25, a CRT video multiplexer 26, a sprite control circuit 27, a flat panel emulation circuit 28, and a DAC (D/A converter) 35.

The register control circuit 11 receives an address and data from the local bus 3 through the system bus interface 12 and performs address decoding and read/write control for various registers designated by the decoding result.

The system bus interface 12 performs interface control with respect to the host CPU 1 through the local bus 3 and supports burst transfer. In addition, a cache 121 is incorporated in the system bus interface 12. The cache 121 is used to allow high-speed image data transfer between the host CPU 1 or the accelerator 13 and the video memory 30 and holds part of image data in the video memory 30. When image data which is read-requested by the CPU 1 or the accelerator 13 is present in the cache 121, the image data is read out from the cache 121 and transferred to the CPU 1 or the accelerator 13. In this case, the video memory 30 is not accessed.

The graphics accelerator 13 provides various drawing functions for image data in the video memory 30 in response to an instruction from the CPU 1. The accelerator 13 has functions including pixel block transfer such as BitBlt (bit block transfer), line drawing, arc drawing, area painting, logic/arithmetic calculation between pixels, frame extraction, map masking, addressing on X-Y coordinates, and memory management by paging.

As shown in FIG. 2, the accelerator 13 is constituted by a coprocessor register 131, an X-Y address generation unit 132, a linear address translation unit 133, a data transfer control unit 134, a paging unit 135, and an arithmetic and logic unit (ALU) 136.

The coprocessor register 131 has a plurality of I/O registers capable of being accessed by the CPU 1. Parameter values for using the drawing functions of the accelerator 13 or the like are set in these registers.

The X-Y address generation unit 132 generates a two-dimensional X-Y address for access to a rectangular area transferred by BitBlt or line drawing. In this case, the X-Y address for line drawing is calculated by a line drawing circuit 132a incorporated in the X-Y address generation unit 132. To increase the line drawing speed, the line drawing circuit 132a has a logic for detecting a horizontal line component included in a line as a drawing target and causing the data transfer control unit 134 to execute data transfer to the video memory 30 in units of horizontal lines. In this case, a transfer request is notified from the line drawing circuit 132a to the data transfer control unit 134 with a signal TRRQ (TRansfer ReQuest). The number of transfer pixels is designated by a signal NOPEL (Number Of PixEL to transfer). Actually, the value NOPEL represents (the number of pixels to transfer)−1.

The arrangement of the line drawing circuit 132a is a characteristic feature of the present invention, and a detailed description will be made later with reference to FIG. 3.

The linear address translation unit 133 translates an X-Y address to a linear address (physical address) for memory access by using segmentation or the like. In this case, linear address translation processing by the linear address translation unit 133 is performed for only the start address. Processing for the subsequent addresses is performed by a linear address control unit 134a in the data transfer control unit 134. The paging unit 135 supports a virtual memory mechanism as that of the CPU 1. In a paging valid state, a linear address prepared by the linear address translation unit 133 or the linear address control unit 134a is translated to a real address by paging. In this translation, an address translation buffer (TLB) is used. In a paging invalid state, the linear address is output as a real address without being processed.

The data transfer control unit 134 performs data transfer control between the system memory 2 and the video memory 30, and has a system memory interface 134b and a pixel data control unit 134c, in addition to the above-mentioned linear address control unit 134a.

The pixel data control unit 134c has a shift circuit 205 and a data buffer 207 and supports pixel data calculation such as shift, logic/arithmetic calculation, bit mask, and color comparison, and the VGA-compatible BitBlt function. Logic/arithmetic calculation is performed in cooperation with the ALU 136.

The memory control circuit 14 shown in FIG. 1 performs access control of the video memory 30. The memory control circuit 14 read/write-accesses the video memory 30 in accordance with an image data read/write request from the CPU 1 and the accelerator 13, and also read-accesses the video memory 30 for frame refresh in accordance with a display address from the CRTC 16.

The memory control circuit 14 has an address control logic and a command control logic to increase the access efficiency to the synchronous DRAM. These logics enable to continuously execute a plurality of read/write cycles to the synchronous DRAM without inserting a precharge cycle. The memory control circuit 14 incorporates an address counter and has a burst transfer function to continuously read/write-access data at a plurality of addresses subsequent to a read address which is set as a start address.

The data bus width between the memory control circuit 14 and the video memory 30 is set equal to the data transfer width of the local bus 3, e.g., 32 bits.

The CRT controller 16, the sprite memory 19, the serializer 20, the latch circuit 21, the foreground/background multiplexer 22, the graphic/text multiplexer 23, the color palette control circuit 24, the sprite color register 25, the CRT video multiplexer 26, the sprite control circuit 27, the flat panel emulation circuit 28, and the DAC (D/A converter) 35 constitute a display control circuit which reads out image data from the video memory 30 and converts the image data to a video signal for frame refresh.

The CRT controller (CRTC) 16 generates various display timing signals (a horizontal sync signal, a vertical sync signal, and the like) for controlling the flat panel display 40 or the color CRT display 50, or a display address for reading out image data as a display screen target from the video memory 30.

In a graphics mode, sprite data is written in the sprite memory 19. In a text mode, font data is written in the sprite memory 19. In the text mode, the code of text data read out from the video memory 30 is supplied to the sprite memory 19 as an index, and font data corresponding to the code is read out.

The serializer 20 is a parallel/serial conversion circuit for dividing parallel pixel data corresponding to a plurality of pixels from the video memory 30 in units of pixels (serial) and outputting the pixel data. In the graphics mode, parallel/serial conversion of image data read out from the video memory 30 and sprite data read out from the sprite memory 19 is performed. In the text mode, parallel/serial conversion of font data read out from the sprite memory 19 is performed.

The latch circuit 21 delays the output timing of an attribute by a delay time in conversion from code data to font data. In the text mode, the latch circuit 21 holds the attribute of text data read out from the video memory 30. The foreground/background multiplexer 22 selects the foreground or background color of the attribute in the text mode. This selection is controlled by a font data value of 1" (foreground) or "0" (background) output from the serializer 20. The graphic/text multiplexer 23 switches the graphics mode and the text mode. In the graphics mode, memory data output from the serializer 20 is selected. In the text mode, an output from the foreground/background multiplexer 22 is selected.

The color palette control circuit 24 performs color conversion of graphic or text data. The color palette control circuit 24 has two color palette tables. The first color palette table consists of 16 color palette registers. Six-bit color palette data is stored in each color palette register. The second color palette table consists of 256 color palette registers. Twenty-four-bit color data consisting of 8-bit R, G, and B data is stored in each color palette register.

In the graphics mode, memory data in XGA specifications of 8-bit/pixel is directly sent to the second color palette table without interposing the first color palette table and converted to color data consisting of 8-bit R, G, and B data. Memory data in VGA specifications of 4-bit/pixel is sent to the first color palette table first, converted to 6-bit color data, and output. Two-bit data output from the color selection register incorporated in the color palette control circuit 24 is added to the 6-bit color data to obtain 8-bit color data. Thereafter, the 8-bit color data is sent to the second color palette table and converted to color data consisting of 8-bit R, G, and B data.

On the other hand, in the text mode, text data in either XGA or VGA specifications is converted to color data consisting of 8-bit R, G, and B data through the first and second color palette tables.

The XGA graphics mode has a direct color mode wherein one pixel consists of 16 or 24 bits. In this case, the pixel data is directly supplied to the CRT video multiplexer 26 without interposing the color palette control circuit 24.

The sprite color register 25 stores sprite display data for designating a sprite display color of, e.g., a hardware cursor. The CRT video multiplexer 26 selects a CRT video display output, i.e., selects an output from the color palette control circuit 24, a direct color output from the serializer 20, sprite display data, or external video data. This selection operation is controlled by a display timing signal from the CRTC 16. The external video data is, e.g., video data input from an external device of the display control system 4. The sprite control circuit 27 outputs sprite display data in the sprite color register 25 in accordance with sprite data which is parallel/serial-converted by the serializer 20.

The flat panel emulation circuit 28 converts a CRT video output to generate flat video data for the flat panel display 40. The DAC 35 converts the CRT video data output from the R, G, video multiplexer 26 to analog R, G, and B signals and supplies the signals to the color CRT display 50.

The arrangement of the line drawing circuit 132a arranged in the accelerator 13 will be described below in detail with reference to FIG. 3.

When straight line drawing is designated, the line drawing circuit 132a detects a horizontal line segment included in the straight line by using an error term of the Bresenham algorithm and calculates the number of pixels to transfer (NOPEL) in units of horizontal line segments. As shown in FIG. 3, the line drawing circuit 132a has a transfer destination X-Y address computation circuit 201, a controller 202, a pixel count (PCNT) circuit 203, and a BET (Bresenham Error Term) circuit 204.

The principle of the Bresenham algorithm will be described below.

Figure 17:
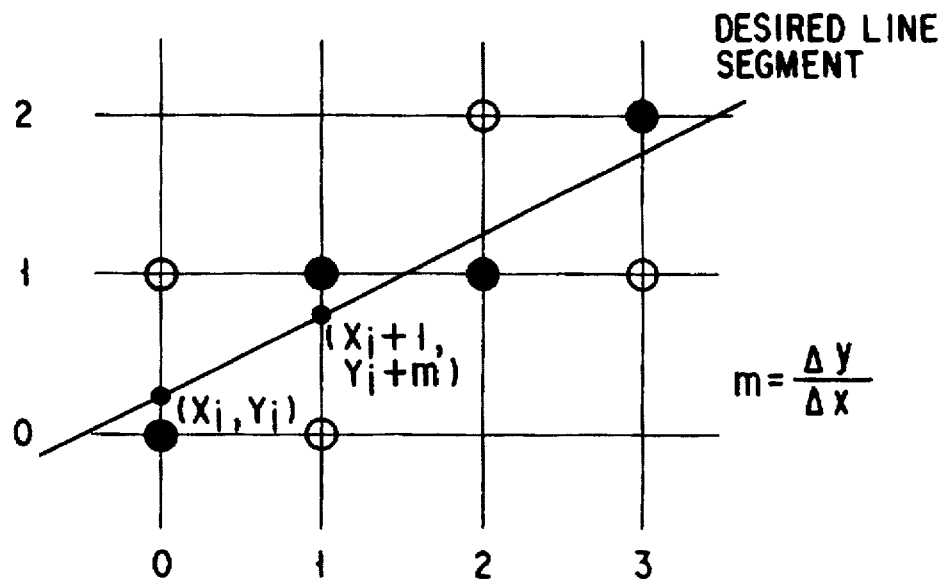
FIGS. 17 and 18 are views for explaining the principle of the Bresenham algorithm.
Figure 18:
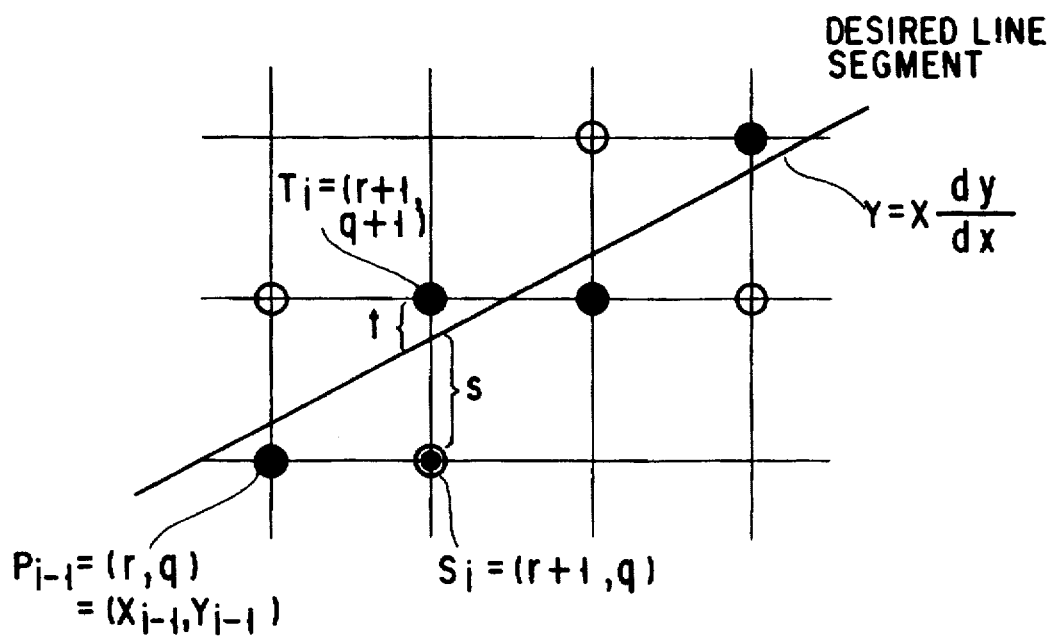

When a line as shown in FIG. 17 is to be drawn, increment calculation of X by rounding Y is necessary to select pixels (indicated by black dots). In this case, since the gradient is a decimal part, variables Y and m must be real numbers or binary decimal parts. The Bresenham algorithm uses no real variable but only integer calculation, so rounding is not necessary. For the descriptive convenience, assume that the gradient of the line segment is between zero and one (within a range of 45°). The algorithm uses, in each step, a determination variable di proportional to the difference between s and t shown in FIG. 18. FIG. 18 shows the ith step wherein it is determined that $(P_i-1)$ is the closest to the actually drawn line segment, and it is determined which value is set as a next pixel Ti or Si. If s<t, Si is set because it is closer to the desired line segment. Otherwise, Ti is set because it is closer to the desired line segment.

The drawn line segment is from a point (x1,y1) to a point (x2,y2). Assume that the start point is closer to the origin.

When both the points are translated by T(-x1,-y1), the line is represented as a segment from a point (0,0) to a point (dx,dy) where dx=x2-x1, and dy=y2-y1. The equation of line segment is expressed as y=(dy/dx)x. With reference to FIG. 18, the coordinates of (Pi-1) (after translation) are represented by (r,q). In this case, Si=(r+1,q), and Ti=(r+1,q+1).

From FIG. 18, s=dy(r+1)/dx-q, and t=q+1-dy(r+1)/dx are obtained. Therefore, the following equation is obtained:

$$s-t=2dy(r+1)/dx-2q-1 \quad (1)$$

If s-t<0, St is selected. By arranging equation (1), the following equation is obtained:

$$dx(s-t)=2(r \cdot dy-q \cdot dx)+2dy-dx$$

Since dx is positive ds(s-t)<0 can be used as a test for determining whether Si is selected, so this inequality is defined as di. Therefore, $$di=2(r \cdot dy-q \cdot dx)+2dy-dx$$

Since r=xi-1, and q=yi-1, $$di=2xi-1dy-2yi-1dx+2dy-dx \quad (2)$$

When 1 is added to each index, $$di+1=2xi \cdot dy-2yi \cdot dx+2dy-dx$$

When di is subtracted from (di+1), $$di+1-di=2dy(xi-xi-1)-2dx(yi-yi-1),$$

where xi-xi-1=1. When this equation is rearranged, the following equation is obtained:

$$di+1=di+2dy-2dx(yi-yi-1).$$

If di≧0, Ti is selected. In this case, yi=yi+1, and the following equation is obtained:

$$di+1=di2(dy-dx) \quad (3)$$

If di<0, Si is selected. In this case, yt=yt-1, and the following equation is obtained:

$$di+1=di+2dy \quad (4)$$

As a result, a repeat method is obtained in which (di+1) is calculated from di, and Si or Ti is selected. Since (x0,y0) =(0,0), the initial start value di for i=1 is obtained in accordance with equation (2). At this time, $$di=2dy-dx \quad (5)$$

Calculations necessary for calculating equations (3) to (5) are minimum, i.e., addition, subtraction, and left shift (multiplication of 2). This is important for the sake of avoiding multiplication which takes long time. An example of the Bresenham algorithm will be shown below.

```
procedure BRESENHAM (x1, y1, x2, y2, value:integer);
    var dx, dy, incr1, incr2, d, x, y, xend:integer;
begin
    dx: = ABS(x2 - x1);
    dy: = ABS(y2 - y1);
    d: = 2*dy - dx;        {initial value of d}
    incr1: = 2*dy;         {constant used for increment when
```

-continued

```
                    d < 0}
incr2: = 2*(dy − dx);   {constant used for increment when
                    d ≧ 0}
if x1 > x2
    then begin
        x: = x2;
        y: = y2;
        xend: = x1
    end
    else begin
        x: = x1;
        y: = y1;
        xend: = x2
    end
    WRITE_PIXEL(x, y, value);   {first point on the line
                                 segment }
    whilex<xend do begin
        x: = x + 1;
        if d < 0
            the d: = d + incr1   {Si is selected; no change
                                  in y}
            else begin
                y: = y + 1;
                d: = d + incr2
            end
            WRITE_PIXEL(x, y, value)   {selected point near
                                        the line segment}
        end         {while}
end             {BRESENHAM}
```

The Line Draw function uses the Bresenham line drawing algorithm to draw a line of pixels into the destination. The Bresenham line drawing algorithm operates with all parameters normalized to the first octant (octant 0 in FIG. 13) The octant code for the actual octant in which the line lies must be specified in the octant field of the Pixel Operation Register. This contains a 3bit code that is made up of three 1 bit flags called DX, DY and Dz.

Dx is 1 for negative X direction, 0 for positive X
DY is 1 for negative Y direction, 0 for positive Y
DZ is 1 for |X|<|Y|, 0 for |X|>|Y| ("|X|" is the magnitude of X, the value ignoring the sign) The octant value is formed by concatenating DX, DY and DZ.

FIG. 14 is a view showing a 32-bit register for defining the operation executed by the coprocessor. Fields 1 to 9 shown in FIG. 14 are as follows.

1. Background Source
2. Foreground Source
3. Step Function
4. Source Pixel Map
5. Destination Pixel Map
6. Pattern Pixel Map
7. Mask Pixel Map
8. Drawing Mode
9. Direction Octant Background Source These bits determine the origin of the Background source pixels when an operation is performed. The encoding for these bits is as follows:

Background Color "00"b (for example, for a fixed pattern line draw using a fixed register value)
Source Pixel Map "10"b (for example, for a variable color data pattern held in video memory to video memory draw).

In this example the contacts of this field are ignored as the line is solid and so has no Background pixels:

Background Source="00"b
Foreground Source

These bits determine the origin of the Foreground Source pixels when an operation is performed. The encoding for these bits is as follows:

Foreground "Color "00"b (for example, for a fixed pattern line draw using a fixed register value)
Source Pixel Map "10"b (for example, for a variable color data pattern held in video memory to video memory draw).

For this example:

Foreground Source="00"b (Solid Foreground Color)
Step Function

These bits define the type of operation that the coprocessor is required to do. Draw & Step Read "0010"b

| Line Draw Read | "0011"b |
| Draw & Step Write | "0100"b |
| Line Draw Write | "0101"b |
| PxBlt | "1000"b |
| Inverting PxBlt | "1001"b |
| Area Fill PxBlt | "1010"b |

For this example:

Step Function="0101"b (Line Draw Write)
Source Pixel Map

These bits define which Pixel map is used as the Source Map in the operation. This enables different maps to be setup in advance and defined for use as this register is loaded. The encoding for these bits is as follows:

| Pixel Map A | "0001"b |
| Pixel Map B | "0010"b |
| Pixel Map C | "0011"b |

In this example, the contents of this field is ignored.

Source Pixel Map="0001"b (must not be a reserved value)
Destination Pixel Map

These bits define which Pixel Map is used as the Destination Map in the operation. This enables different maps to be setup in advance and defined for use as this register is loaded.

The encoding for these bits is as follows:

| Pixel Map A | "0001"b |
| Pixel Map B | "0010"b |
| Pixel Map C | "0011"b |

For this example:

Destination Pixel Map="0001"b (Pixel Map A)
Patter Pixel Map

These bits define which Pixel Map is used as the Pattern Map in the operation. This enables different maps to be setup in advance and defined for use as this register is loaded.

The encoding for these bits is as follows:

| Pixel Map A | "0001"b |
| Pixel Map B | "0010"b |
| Pixel Map C | "0011"b |
| Foreground (fixed) | "1000"b |
| Generated from Source | "1001"b |

For this example:

Pattern Pixel Map="1000"b (Foreground (fixed), for a solid Line)
Mask Pixel Map

These bits define whether mask Map is used or not in the operation.

The encoding for these bits is as follows:

| | |
|---|---|
| Mask Map Disabled | "00"b |
| Mask Map Boundary Enabled | "01"b |
| Mask Map Enabled | "10"b |

For this example:
Mask Pixel Map="00"b (Mask Map disabled)
Drawing Mode
These bits determine the attributes of a Line Draw. The encoding for these bits is as follows:

| | |
|---|---|
| Draw All Pixels | "00"b |
| Draw First Pixel Null | "01"b |
| Draw Last pixel Null | "11"b |
| Mask Last Pixel Null | "11"b |

The first three of these options can be used when drawing a line. The fourth option is four use when drawing the outline of a shape to be filled using the Area Fill capability of the hardware.
For this example:
Drawing Mode="00"b (Draw All Pixels)
Direction Octant
As shown in FIG. 16, these bits, when concerned with Line Draws determine the direction that the Line is drawn in.
The encoding for these bits is as follows:

| | |
|---|---|
| Bit 2(DX) | "1"b if Negative X direction |
| Bit 2(DX) | "0"b if Positive X direction |
| Bit 1(DY) | "1"b if Negative Y direction |
| Bit 1(DY) | "0"b if Positive Y direction |
| Bit 0(DZ) | "1"b if IXI < IYI |
| Bit 0(DZ) | "0"b if IXI > IYI (magnitude) |

For this example:
Direction Octant="000"b (X+ve, Y+ve, IXI>IYI)
Putting all these together of rour example Line Draw Operation, the coprocessor register 131 should be set as shown in FIG. 15.

For easy understanding of the operation of each circuit, the principle of calculation of the transfer destination X-Y address (DX,DY) using the Bresenham algorithm will be described first. The Bresenham algorithm is used to execute the line drawing function. It is determined in units of pixels which values are set as next coordinate values (X+1,Y) or (X+1,Y+1) of the current coordinate values (X,Y). With this operation, the coordinate values of pixels connecting the start point coordinates and the end point coordinates are calculated. This algorithm uses the following three parameters normalized to the first octant (octant 0).

1. Bresenham Error Term E {E=2×deltaY−deltaX}
2. Bresenham Constant K1 {K1=2×deltaY}
3. Bresenham Constant K2 {K2=2×(deltaY−deltaX)}

Figure 4:
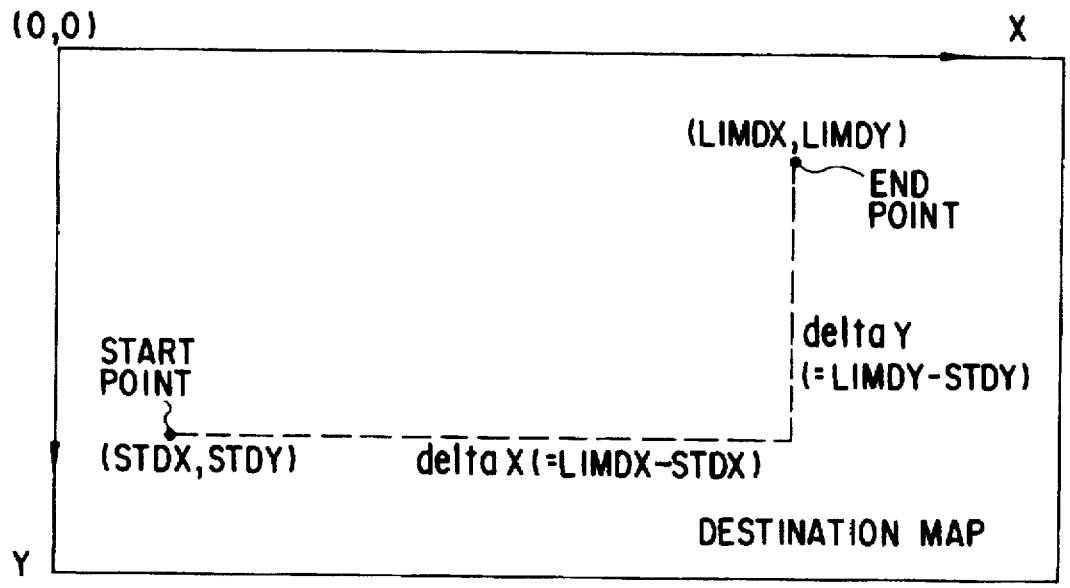
FIG. 4 is a view for explaining parameters of the Bresenham algorithm used by the line drawing circuit shown in FIG. 3.

DeltaX represents the difference between the X address value of the end point coordinates and that of the start point coordinates while deltaY represents the difference between the Y address value of the end point coordinates and that of the start point coordinates. For example, as shown in FIG. 4, when the transfer destination start point coordinate values on the destination map are (STDX,STDY), and the transfer destination end point coordinate values are (LIMDX, LIMDY), deltaX=LIMDX−STDX
deltaY=LIMDY−STDY The Bresenham error term E is used to determine which values are set as the next transfer destination coordinate values (X+1,Y) or (X+1,Y+1) of the current destination coordinate values (X,Y). If the Bresenham error term E r 0, the values (X+1,Y+1) are selected. If the Bresenham error term E<0, the values (X+1,Y) are selected.

Figure 5:
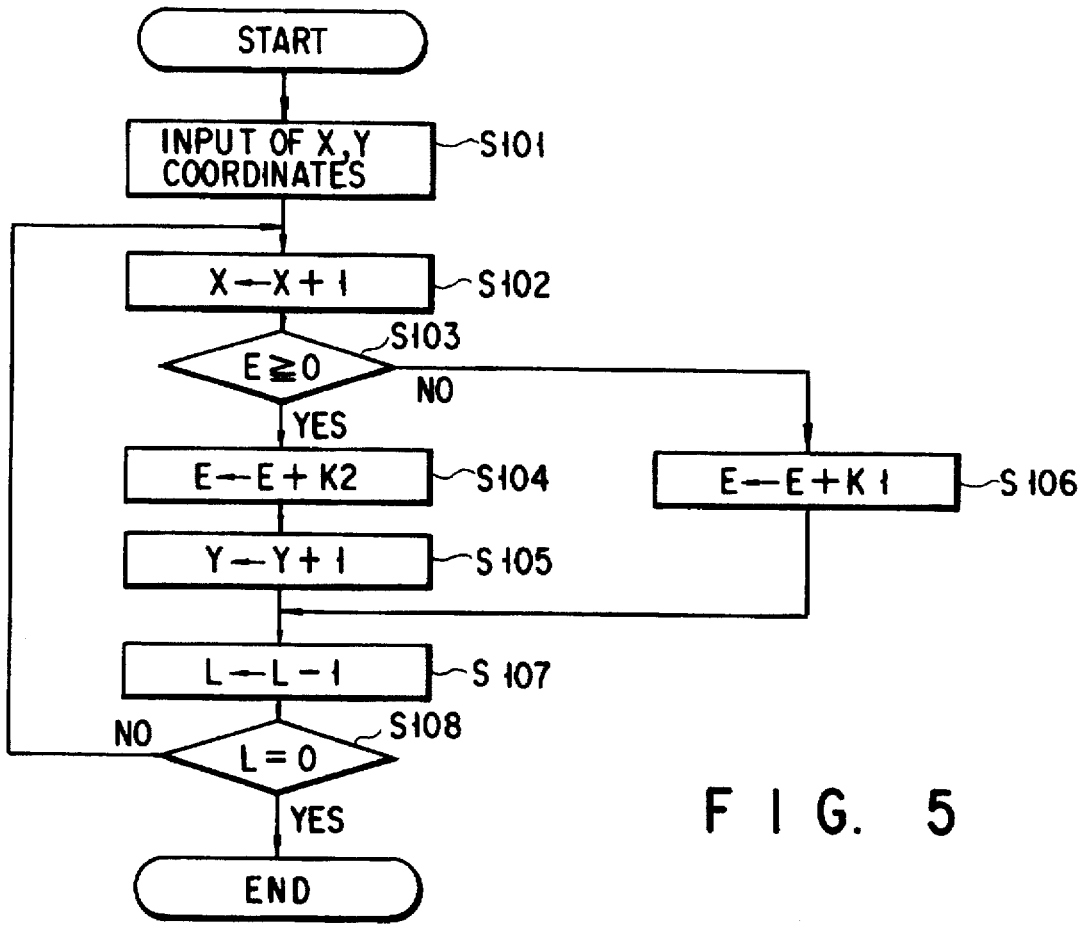
FIG. 5 is a flow chart for explaining a coordinate value determination operation using the Bresenham algorithm executed by the line drawing circuit shown in FIG. 3.

Line drawing procedures using the Bresenham algorithm are as shown in FIG. 5.

First, the X-Y coordinate values of the start and end points are given. In accordance with the coordinate values, the parameters E, K1, and K2 are obtained and set in the coprocessor register 131 (step S101). After the X address value of the start point coordinates is incremented by one, it is checked whether the Bresenham error term E≧0 (step S104).

If E≧0, the value E is updated to (E+K2), and the Y address value of the start point coordinates is incremented by one (steps S104 and S105). With this operation, the next pixel coordinate values of the start point coordinates (X,Y) are determined as (X+1,Y+1).

If E<0, only the value E is updated to (E+K1), and the Y address value of the start point coordinates is not updated (step S106). With this operation, the next pixel coordinate values of the start point coordinates (X,Y) are determined as (X+1,Y).

When the next pixel coordinate values are determined, a segment length L (L=X address of the end point coordinates−X address of the start point coordinates) is decremented by one (step S107).

Processing in steps S102 through S107 is repeatedly executed until the segment length L becomes zero (step S108). With this processing, a line segment from the start point to the end point is drawn.

The transfer destination X-Y address computation circuit 201 shown in FIG. 3 is controlled in accordance with a control signal from the controller 202 to calculate the transfer destination X-Y addresses (DX,DY) and the number of pixels to transfer (NOPEL) for straight line drawing. The transfer destination X-Y addresses (DX,DY) are calculated in units of pixels constituting the straight line in accordance with the Bresenham algorithm and sent to the linear address translation unit 133. In horizontal line drawing, the number of pixels to transfer (NOPEL) represents (the horizontal line length), i.e., (the number of pixels constituting the horizontal line)−1. In drawing a straight line having a gradient, the value NOPEL represents (the number of pixels of a horizontal line segment as a transfer target)−1, which horizontal line segment is one of a plurality of horizontal line segments constituting the straight line.

The transfer destination X-Y address computation circuit 201 has a DX counter 301, a next DX (NDX) counter 302, a DY counter 303, a subtracter 304, comparators 305 and 306, and an OR gate 307.

A transfer start destination X address (STDX) is loaded in the DX counter 301. The value STDX represents the X address value of the start point coordinates. The initial value of an output DX from the DX counter 301 is STDX. When a DX update request signal (DXUDRQ) is issued from the controller 202, the value STDX is incremented by (NOPEL+ 1), which value NOPEL is output from the subtracter 304 at that time. The output DX from the DX counter 301 is supplied to the first input terminal of the subtracter 304.

In horizontal line drawing, a destination X address limit value (LIMDX) is loaded in the NDX counter 302 as an initial value. The value LIMDX becomes the X address value of the end point coordinates of the line when the end point coordinates do not cross the destination or the mask map boundary, or becomes the last X address value in the map when the end point coordinates cross the destination or the mask map boundary.

In drawing a line having a gradient, the value STDX is loaded in the NDX counter 302 as an initial value. In this case, the value STDX in the NDX counter 302 is incremented by one in units of pixels in accordance with a Bresenham error term update request pulse (BETUD) from the controller 202. The Bresenham error term update request pulse (BETUD) is a signal used to update the Bresenham error term E to (E+K2) or (E+K1) and generated every time a pixel coordinate value is determined.

Whether the value LIMDX or STDX is loaded in the NDX counter 302 is controlled by the controller 202. An output NDX from the NDX counter 302 is supplied to the second input terminal of the subtracter 304 and the first input terminal of the comparator 305. The value LIMDX is supplied to the second input terminal of the comparator 305.

A transfer start destination Y address value (STDY) is loaded in the DY counter 303. The value STDY represents the Y address value of the start point coordinates. The value DY in the DY counter 303 is incremented by one in accordance with a DY update request signal (DYUDRQ) from the controller 202. The DY update request signal (DYUDRQ) is generated when the Bresenham error term E r 0, i.e., when the coordinate values (X+1,Y+1) are selected.

The output DY from the DY counter 303 is supplied to the first input terminal of the comparator 306. A value LIMDY is supplied to the second input terminal of the comparator 306. The value LIMDY represents the Y address value of the end point coordinates of the line when the end point coordinates do not cross the destination or the mask map boundary, or becomes the last Y address value in the map when the end coordinates cross the destination or the mask map boundary.

The subtracter 304 subtracts the output value DX from the DX counter 301 from the output value NDX from the NDX counter 302, thereby calculating |NDX−DX| as the number of pixels to transfer (NOPEL).

In horizontal line drawing, the output value NDX from the NDX counter 302 is equal to the value LIMDX. Therefore, |NDX−DX| (=NOPEL) corresponds to (the number of pixels constituting the horizontal line)−1.

In drawing a line having a gradient, the output value NDX from the NDX counter 302 is incremented by one in units of pixels. The output DX from the DX counter 301 is incremented by a value of |NDX−DX| (=NOPEL) every time the DY update request signal (DYUDRQ) is generated.

For this reason, in drawing a line having a gradient, when the DY update request signal (DYUDRQ) is generated, |NDX−DX| (=NOPEL) represents (the number of pixels of a horizontal line segment as a transfer target)−1, which horizontal line segment is one of the horizontal line segments constituting the line as a drawing target.

The comparator 305 compares the output NDX from the NDX counter 302 with the value LIMDX. When the two values coincide with each other, a coincidence signal at logic "1" level is output to the OR gate 307. The comparator 306 compares the output DY from the DY counter 303 with the value LIMDY. When the two values coincide with each other, a coincidence signal at logic "1" level is output to the OR gate 307.

When a coincidence signal is output from the comparator 305 or 306, a last transfer signal (LASTTR; LAST TRansfer) is output from the OR gate 307 to the controller 202. The signal LASTTR represents that the transfer end condition is established, and transfer for drawing is completed in the next transfer cycle.

The controller 202 executes operation control for the entire line drawing circuit 132a and interface control with respect to the data transfer control unit 134.

Figure 11:
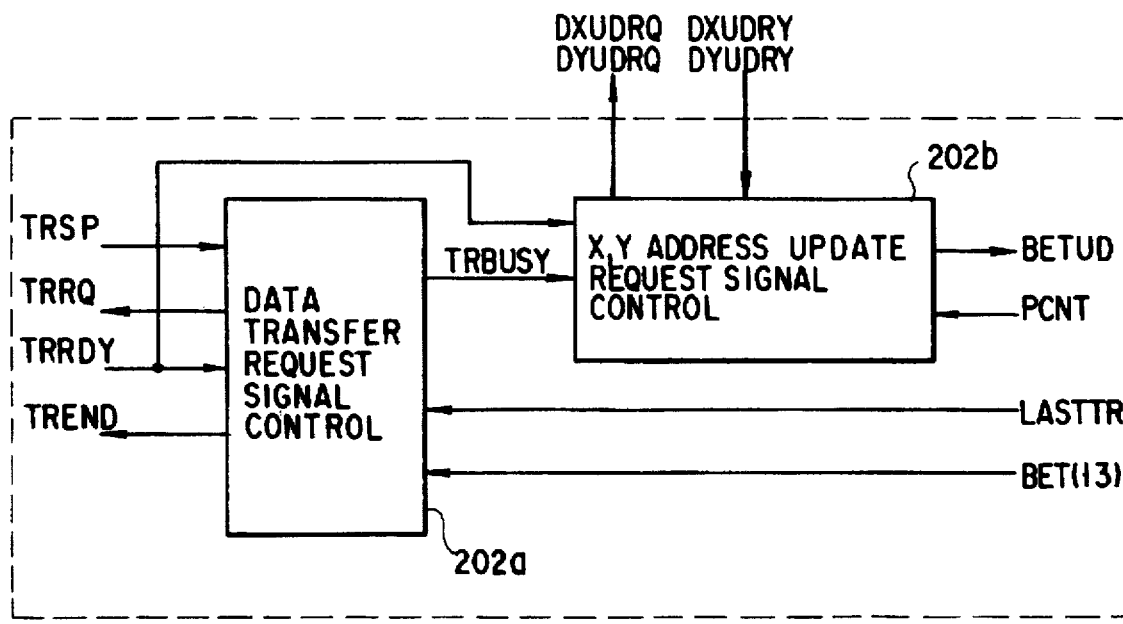
FIG. 11 is a detailed block diagram of a controller 202 shown in FIG. 3.

As shown in FIG. 11, the controller 202 is constituted by a data transfer request signal control circuit 202a and an X, Y address update request signal control circuit 202b. The data transfer request signal control circuit 202a receives a transfer start pulse (TRSP), a transfer ready signal (TRRDY), the last transfer signal (LASTTR), and a bit-13 signal (BET<13>) of an error term data string (BET<13−0>) and generates a transfer request signal (TRRQ) and a transfer end signal (TREND). When the signal (BET<13>) =0, the data transfer request signal control circuit 202a outputs the data transfer request signal (TRRQ).

The X, Y address update request signal control circuit 202b receives a pixel count signal, ready signals DXUDRY and DYUDRY for the update request signals DXUDRQ and DYUDRQ, and a transfer busy signal (TRBUSY) from the data transfer request signal control circuit 202a and outputs the DX update request signal (DXUDRQ) and the DY update request signal (DYUDRQ), and also outputs the Bresenham error term update request pulse (BETUD).

When the signal TRBUSY is at level "1", the X, Y address update request signal control circuit 202b outputs the update request signals (DXUDRQ and DYUDRQ).

The transfer start pulse (TRSP; TRansfer Start Pulse), the transfer request signal (TRRQ; TRansfer ReQuest), the transfer ready signal (TRRDY; TRansfer ReaDY), and the transfer end signal (TREND; TRansfer END) are transferred between the controller 202 and the data transfer control unit 134.

The transfer start pulse (TRSP) represents data transfer start for line drawing and is sent to from the data transfer control unit 134 to the controller 202 when, e.g., a line drawing command is set in the coprocessor register 131.

The transfer request signal (TRRQ) requests data transfer to the data transfer control unit 134, as described above. The number of pixels to transfer at that time is designated to the data transfer control unit 134 in accordance with the value NOPEL. The transfer request signal (TRRQ) is generated when the Bresenham error term E changes from a negative value to E≧0, or in response to the last transfer signal (LASTTR).

The transfer ready signal (TRRDY) is sent from the data transfer control unit 134 to the controller 202 and represents reception of the transfer request signal (TRRQ).

The transfer end signal (TREND) is sent from the controller 202 to the data transfer control unit 134 and represents that issue of all data transfer requests for drawing is completed.

In addition to the last transfer signal (LASTTR), the Bresenham error term update request pulse (BETUD), the DX update request signal (DXUDRQ), and the DY update request signal (DYUDRQ), as described above, the ready signals DXUDRY and DYUDRY for the update request signals DXUDRQ and DYUDRQ, and the like are transferred between the controller 202 and the address computation circuit 201.

The pixel count (PCNT) circuit 203 counts the number of remaining pixels in the line as a drawing target, whose coordinate values are not calculated yet, and generates a pixel count signal (PEL count). The value of the pixel count signal (PCNT; PEL count) is decremented by one per pixel in accordance with the Bresenham error term update request pulse (BETUD). The number of remaining pixels becomes zero when transfer is ended. In horizontal line drawing, all pixels constituting the horizontal line are transferred once.

Therefore, the value of the pixel count signal (PEL count) is decremented once by the value NOPEL+1.

The BET circuit 204 sequentially updates the Bresenham error term E in accordance with the Bresenham algorithm described with reference to FIG. 5 and outputs the sign bit of the Bresenham error term E. A case is assumed in which the Bresenham error term E is within a range of $-8192 \leq E \leq 8191$. The sign bit is set at bit 13 (BET<13>) of the error term data string (BET<13–0>).

The operation of the line drawing circuit 132a shown in FIG. 3 will be described below with reference to FIGS. 6 through 9.

Figure 6:
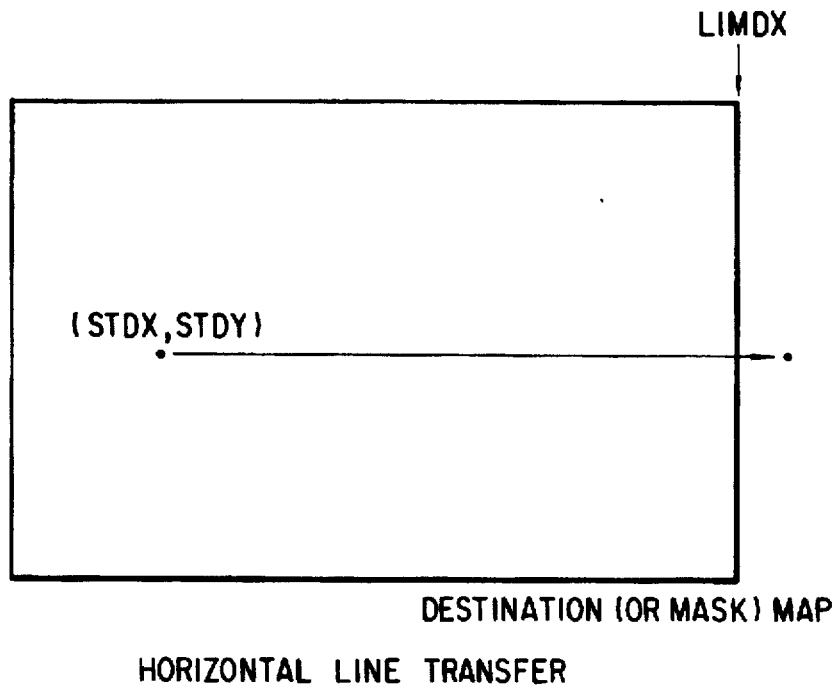
FIG. 6 is a view showing a horizontal line drawn by the line drawing circuit shown in FIG. 3.

The operation in transfer of a horizontal line as shown in FIG. 6 will be described below with reference to timing charts shown in FIGS. 7A through 7Q. Referring to FIG. 6, the start point coordinates and the end point coordinates are designated to cross the destination map boundary.

In this case, since deltaY is zero, the three parameter values used in the Bresenham algorithm are obtained as follows:

K1=0
K2=2×deltaX
E=−deltaX

These parameter values are set in the coprocessor register 131 and referred to by the BET circuit 204 and the controller 202.

Since K1=0, the controller 202 recognizes that the line as a drawing target is a horizontal line.

When the transfer start pulse (TRSP) is sent from the data transfer control unit 134 to the controller 202, the controller 202 loads the values STDX and STDY in the DX counter 301 and the DY counter 303, respectively, and at the same time, loads the value LIMDX in the NDX counter 302. In this case, the value LIMDX represents the last X address value of the destination map. In addition, since the output NDX from the NDX counter 302 is equal to the value LIMDX, the last transfer signal (LASTTR) is sent to the controller 202.

The controller 202 issues the transfer request signal (TRRQ) in response to the last transfer signal (LASTTR) to request the data transfer control unit 134 to transfer data. At this time, the value NOPEL (=INDX−DXI) obtained by the subtracter is sent to the data transfer control unit 134 as the number of pixels to transfer. The output DX from the DX counter 301 and the output DY from the DY counter 303 are sent to the linear address translation unit 133 as a transfer start X-Y address and translated to a start address for transferring data to the video memory 30.

Upon reception of the transfer request signal (TRRQ), the data transfer control unit 134 starts block transfer in which pixel data corresponding to "NOPEL+1" is continuously transferred to the video memory 30 by using the memory control circuit 14, and writes the pixel data at the contiguous addresses of the video memory 30.

When data transfer is completed, and the transfer ready signal (TRRDY) changes from an active state to an inactive state, the controller 202 issues the Bresenham error term update request pulse (BETUD). In response to the Bresenham error term update request pulse (BETUD), the value of the pixel count signal (PCNT) is decremented at once by the value "NOPEL+1" and becomes zero. Thereafter, the controller 202 issues the transfer end signal (TREND) to notify the data transfer control unit 134 of completion of issue of all data transfer requests for drawing.

As described above, in horizontal line drawing, the number of pixels constituting the horizontal line is calculated, and data corresponding to the number of pixels is transferred to the video memory 30 at once. Therefore, the horizontal line drawing performance can be largely improved as compared to the conventional graphics controller which transfers data to the video memory in units of pixels.

Figure 8:
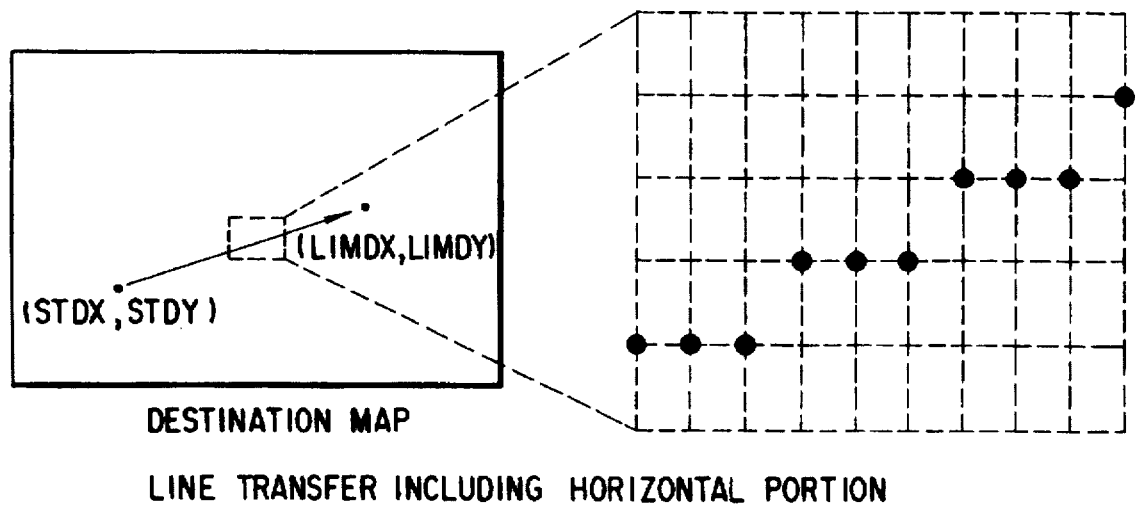
FIG. 8 is a view showing a straight line including a horizontal line portion drawn by the line drawing circuit shown in FIG. 3.

The operation in drawing a line including horizontal line segments as shown in FIG. 8 will be described below with reference to timing charts shown in FIGS. 9A through 9R. Referring to FIG. 8, the start point coordinates and the end point coordinates are set within the destination map boundary.

In this case, since deltaY is not zero, the three parameter values used in the Bresenham algorithm are obtained as follows:

K1=2×deltaY
K2=2×(deltaY−deltaX)
E=2×deltaY−deltaX

These parameter values are set in the coprocessor register 131 and referred to by the BET circuit 204 and the controller 202.

Since K1 and K2 are not zero, the controller 202 recognizes that the line as a drawing target is a line having a gradient.

When the transfer start pulse (TRSP) is sent from the data transfer control unit 134 to the controller 202, the controller 202 loads the values STDX and STDY in the DX counter 301 and the DY counter 303, respectively, and at the same time, loads the value STDX in the NDX counter 302.

The controller 202 issues the Bresenham error term update request (BETUD) in units of pixels to obtain the pixel coordinate values subsequent to the values STDX and STDY, and checks whether the output BET<13> from the BET circuit 204, which responds to the Bresenham error term update request pulse, is zero.

While the value BET<13> is one, i.e., while the Bresenham error term E<0, the update request signals DXUDRQ and DYUDRQ to the DX counter 301 and the DY counter 303 are not generated, and only the output NDX from the NDX counter 302 is incremented by one in response to the Bresenham error term update request pulse (BETUD).

When the value BET<13> becomes zero, i.e., when the Bresenham error term E r 0, the controller 202 issues the transfer request signal (TRRQ) to request the data transfer control unit 134 to transfer data.

At this time, the value NOPEL (=INDX−DXI) obtained by the subtracter is sent to the data transfer control unit 134 as the number of pixels to transfer.

In the timing charts shown in FIGS. 9A through 9R, when the value BET<13> become zero for the first time, NDX=NDX+1, and DX=STDX. Therefore, the value NOPEL becomes one.

The output DX (=STDX) from the DX counter 301 and the output DY (=STDY) from the DY counter 303 are sent to the linear address translation unit 133 as a transfer start X-Y address and translated to a start address for transferring data to the video memory 30.

Upon reception of the transfer request signal (TRRQ), the data transfer control unit 134 starts block transfer in which pixel data corresponding to (NOPEL+1) (2 in this case) is continuously transferred to the video memory 30 by using the memory control circuit 14, and writes the pixel data at the continuous addresses of the video memory 30.

When data transfer is completed, and the transfer ready signal (TRRDY) changes from an active state to an inactive state, the controller 202 issues the update request signals DXUDRQ and DYUDRQ to the DX counter 301 and the DY counter 303, updates the output DY from the DY counter 303, which represents the Y address value of the next pixel, to (DY+1), and increments the output DX from the DX counter 301 by the number of transferred pixels (NOPEL+ 1).

Thereafter, until the value BET<13> becomes zero, i.e., until the Bresenham error term E r 0, the update request signals DXUDRQ and DYUDRQ to the DX counter 301 and the DY counter 303 are not generated, and only the output NDX from the next DX (NDX) counter 302 is incremented by one in response to the Bresenham error term update request pulse (BETUD).

When BET<13> becomes zero, the controller 202 issues the transfer request signal (TRRQ) to request the data transfer control unit 134 to transfer data. At this time, the value NOPEL (2 in this case) obtained by the subtracter is sent to the data transfer control unit 134 as the number of pixels to transfer.

The output DX from the DX counter 301 and the output DY from the DY counter 303 at this time are sent to the linear address translation unit 133 as transfer start X-Y addresses and translated to a start address for transferring data to the video memory 30.

Upon reception of the transfer request signal (TRRQ), the data transfer control unit 134 starts block transfer in which pixel data corresponding to (NOPEL+1) (3 in this case) is continuously transferred to the video memory 30 by using the memory control circuit 14, and writes the pixel data at the continuous addresses of the video memory 30. When data transfer is completed, and the transfer ready signal (TRRDY) changes from an active state to an inactive state, the controller 202 issues the update request signals DXUDRQ and DYUDRQ to the DX counter 301 and the DY counter 303, updates the output DY from the DY counter 303, which represents the Y address value of the next pixel, to (DY+1), and increments the output DX from the DX counter 301 by the number of transferred pixels (NOPEL+ 1).

When NDX=LIMDX, or DY=LIMDY, the last transfer signal (LASTTR) is sent to the controller 202.

In response to the last transfer signal (LASTTR), the controller 202 issues the transfer request signal (TRRQ) to request the data transfer control unit 134 to transfer data. At this time, the value NOPEL (0 in this case) obtained by the subtracter is sent to the data transfer control unit 134 as the number of pixels to transfer. The output DX from the DX counter 301 and the output DY from the DY counter 303 are sent to the linear address translation unit 133 as transfer start X-Y addresses and translated to a start address for transferring data to the video memory 30.

Upon reception of the transfer request signal (TRRQ), the data transfer control unit 134 transfers pixel data corresponding to (NOPEL+1) to the video memory 30 by using the memory control circuit 14 and writes the pixel data in the video memory 30.

When data transfer is completed, and the transfer ready signal (TRRDY) changes from an active state to an inactive state, the controller 202 issues the Bresenham error term update request pulse (BETUD). In response to the Bresenham error term update request pulse (BETUD), the value of the pixel count signal (PCNT) becomes zero. Thereafter, the controller 202 issues the transfer end signal (TREND) to notify the data transfer control unit 134 of completion of issue of all data transfer requests for drawing.

As described above, in drawing a line including horizontal portions as well, the number of pixels constituting each horizontal portion is calculated, and block transfer of data corresponding to the number of pixels to the video memory 30 is performed. Therefore, even when a straight line having a gradient is to be drawn, the drawing performance can be largely improved as compared to the conventional graphics controller.

As for block transfer of pixels constituting a horizontal line segment, the BitBlt function supported by the X-Y address generation unit 132 and the pixel data control unit 134c is preferably used.

This function can be realized when a hardware logic for converting the line parameter values (the transfer start coordinates DX and DY, the number of pixels to transfer NOPEL, and the line width) for designating the horizontal line segment to parameter values corresponding to the BitBlt function is arranged in the accelerator 13, and a value representing the height of a rectangular area is replaced with the line width (e.g., 1).

Figure 10:
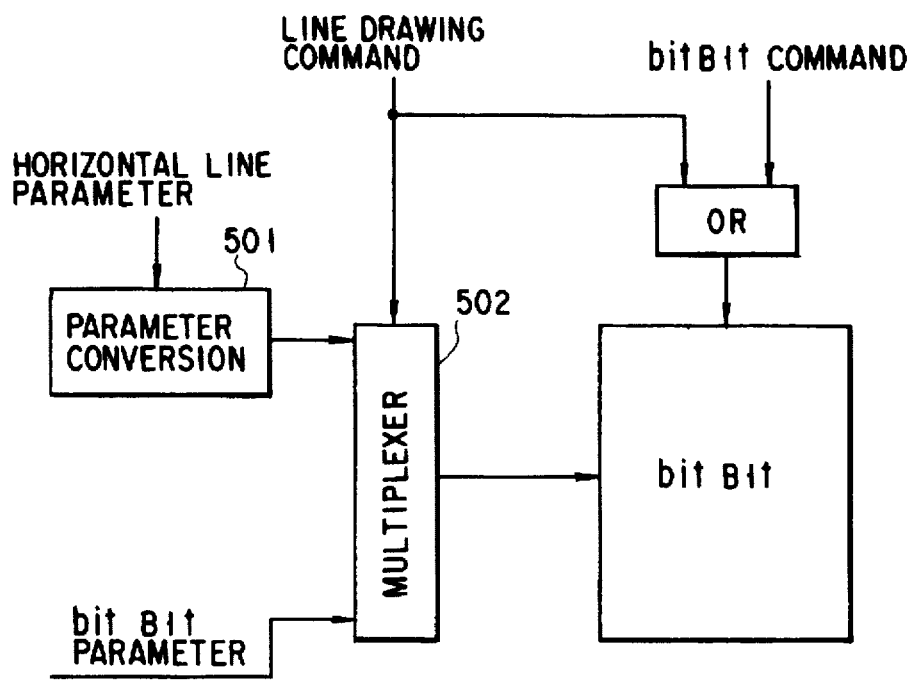
FIG. 10 is a block diagram showing the arrangement of a parameter conversion circuit arranged in the graphics accelerator shown in FIG. 2.

More specifically, as shown in FIG. 10, a parameter conversion circuit 501 and a multiplexer 502 can be arranged in the accelerator 13.

The parameter conversion circuit 501 converts the line parameter values (the transfer start coordinates DX and DY, the number of pixels to transfer NOPEL, and the line width) for designating the horizontal line segment to parameter values (the start point coordinate value, width, and height of a rectangular area) corresponding to the BitBlt function and outputs the parameter values to the multiplexer 502. The multiplexer 502 normally selects parameter values for BitBlt transfer from the coprocessor register 131 and sends the parameter values to the BitBlt transfer logic. However, when a line drawing command is set in the coprocessor register 131, outputs from the parameter conversion circuit 501 are selected and sent to the BitBlt transfer logic in place of the parameter values for BitBlt transfer.

The BitBlt transfer logic operates when either line drawing command or the BitBlt transfer command is set in the coprocessor register 131.

The BitBlt function is a basic function supported by the graphics controller. Therefore, by using the BitBlt function, block transfer of pixels constituting a horizontal line segment can be performed without arranging hardware dedicated to line transfer.

Timings for transferring a line having no horizontal portion will described below with reference to FIGS. 12A through 12R.

When a line segment has no horizontal portion, it means that the line always changes in the Y direction and that the drawing direction is in one of octants 1, 3, 5, and 7 shown in FIG. 13. In this case, pixel data must be transferred bit by bit independently of the Bresenham error term E.

More specifically, the three parameter values used in the Bresenham algorithm are obtained from a line segment normalized to octant 0 as follows:

K1=2×deltaY

K2=2×(deltaY−deltaX)

E=2×deltaY−deltaX

These parameter values are set in the coprocessor register 131 and referred to by the BET circuit 204 and the controller 202.

Since K1 and K2 are not zero, the controller 202 recognizes that the line as a drawing target is a line having a gradient.

When the transfer start pulse (TRSP) is sent from the data transfer control unit 134 to the controller 202, the controller 202 loads the values STDX and STDY in the DX counter 301 and the DY counter 303, respectively, and at the same time, loads the value STDX in the NDX counter 302.

In transfer of a line having no horizontal portion, the line always changes in the Y direction. For this reason, the value BET<13> is zero. Therefore, the controller 202 issues the transfer request signal (TRRQ) to request the data transfer control unit 134 to transfer data.

At this time, the value NOPEL (=|NDX−DX|=0) obtained by the subtracter is sent to the data transfer control unit 134 as the number of pixels to transfer.

The output DX (=STDX) from the DX counter 301 and the output DY (=STDY) from the DY counter 303 are sent to the linear address translation unit 133 as transfer start X-Y addresses and translated to a start address for transferring data to the video memory 30.

Upon reception of the transfer request signal (TRRQ), the data transfer control unit 134 transfers pixel data corresponding to (NOPEL+1) (1 in this case) to the video memory 30 by using the memory control circuit 14 and writes the pixel data in the video memory 30.

Figure 12:
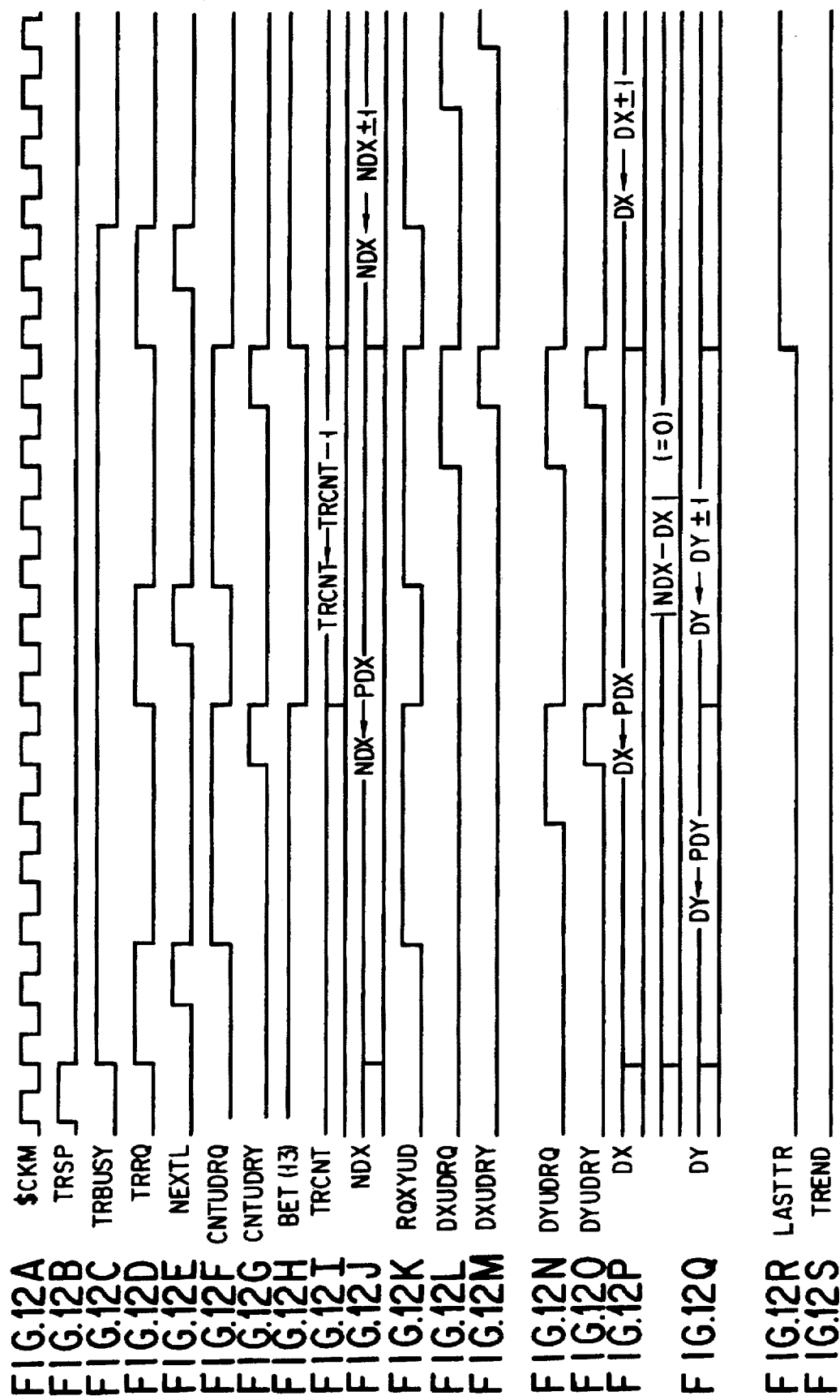
FIGS. 12A through 12S are timing charts for explaining the operation of the line drawing circuit shown in FIG. 3 in drawing a line having no horizontal portion.

Thereafter, the controller 202 issues the update request signal DXUDRQ to the DY counter 303, as shown in FIG. 12I, and updates the output DY from the DY counter 303, which represents the Y address value of the next pixel, to (DY+1), as shown in FIG. 12Q. The update request signal to the DX counter 301 is not output because the line does not change in the X direction. When the value BET<13> shown in FIG. 12H becomes zero, the controller 202 outputs the update request signal DXUDRQ to the DX counter 301, as shown in FIG. 12L.

The last transfer signal (LASTTR) shown in FIG. 12R is sent to the controller 202.

The controller 202 updates the output DX from the Dx counter to (DX+1), as shown in FIG. 12P, and issues the transfer end signal (TREND) shown in FIG. 12S to notify the data transfer control unit 134 of completion of issue of data transfer requests for drawing.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A graphics controller in a computer system having a bitmap video memory and a display monitor, comprising:

means for detecting horizontal line segments included in a straight line when straight line drawing is designated;

means for counting the number of pixels constituting each of the detected horizontal line segments; and data transfer means for performing block transfer of a plurality of drawing data corresponding to the number of pixels constituting each of the horizontal line segments to said video memory and writing the drawing data at continuous addresses of said video memory.

2. A controller according to claim 1, wherein said means for detecting the horizontal line segment includes means for detecting a pixel position where a vertical coordinate value changes by using a Bresenham algorithm, and detects the horizontal line segment in accordance with the detected pixel position.

3. A graphics controller in a computer system having a bitmap video memory and a display monitor, comprising:

BIT block transfer means for transferring image data to a rectangular area designated by parameter values representing start point coordinate values, a width, and a height;

means for detecting horizontal line segments included in a straight line when straight line drawing is designated;

means for counting a number of pixels constituting each of the detected horizontal line segments; and parameter conversion means for converting line parameter values which designate each of the horizontal line segments to parameter values for BIT block transfer and causing said BIT block transfer means to transfer a plurality of drawing data corresponding to the number of pixels constituting each of the horizontal line segments to said video memory.

4. A controller according to claim 3, wherein said parameter conversion means converts line parameter values which designate start point coordinate values, a length, and a line width of the horizontal line segment to the parameter values for BIT block transfer, which designate the start point coordinate value, the width, and the height of the rectangular area, respectively.

5. A pixel data transfer system comprising:

a bitmap video memory;

a display monitor;

means for detecting horizontal line segments included in a straight line when straight line drawing is designated;

means for counting the number of pixels constituting each of the detected horizontal line segments; and data transfer means for performing block transfer of a plurality of drawing data corresponding to the number of pixels constituting each of the horizontal line segments to said video memory and writing the drawing data at continuous addresses of said video memory.

6. A system according to claim 5, wherein said means for detecting the horizontal line segment includes means for detecting a pixel position where a vertical coordinate value changes by using a Bresenham algorithm, and detects the horizontal line segment in accordance with the detected pixel position.

7. A pixel data transfer system comprising:

a bitmap video memory;

a display monitor;

BIT block transfer means for transferring image data to a rectangular area designated by parameter values representing start point coordinate values, a width, and a height;

means for detecting horizontal line segments included in a straight line when straight line drawing is designated;

means for counting a number of pixels constituting each of the detected horizontal line segments; and parameter conversion means for converting line parameter values which designate each of the horizontal line segments to parameter values for BIT block transfer and causing said BIT block transfer means to transfer a plurality of drawing data corresponding to the number of pixels constituting each of the horizontal line segments to said video memory.

8. A system according to claim 7, wherein said parameter conversion means converts line parameter values which designate start point coordinate values, a length, and a line width of the horizontal line segment to the parameter values for BIT block transfer, which designate the start point coordinate value, the width, and the height of the rectangular area, respectively.

* * * * *